US012401859B2

United States Patent
Wang (10) Patent No.: US 12,401,859 B2
(45) Date of Patent: Aug. 26, 2025

(54) METHOD, DEVICE, TERMINAL EQUIPMENT AND COMPUTER-READABLE STORAGE MEDIUM FOR SYNCHRONOUS DISPLAY OF VIDEO INFORMATION

(71) Applicant: BEIJING BYTEDANCE NETWORK TECHNOLOGY CO., LTD., Beijing (CN)

(72) Inventor: Yuechen Wang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 181 days.

(21) Appl. No.: 17/602,260

(22) PCT Filed: Jan. 21, 2020

(86) PCT No.: PCT/CN2020/073385
§ 371 (c)(1),
(2) Date: Oct. 7, 2021

(87) PCT Pub. No.: WO2020/207101
PCT Pub. Date: Oct. 15, 2020

(65) Prior Publication Data
US 2022/0167059 A1    May 26, 2022

(30) Foreign Application Priority Data
Apr. 11, 2019   (CN) .......................... 201910290046.4

(51) Int. Cl.
*H04N 21/482* (2011.01)
*G06F 3/0482* (2013.01)
(Continued)

(52) U.S. Cl.
CPC ....... *H04N 21/4825* (2013.01); *G06F 3/0482* (2013.01); *G06F 3/0485* (2013.01);
(Continued)

(58) Field of Classification Search
CPC ......... H04N 21/4825; H04N 21/42204; H04N 21/47202; H04N 21/478; H04N 21/485;
(Continued)

(56) References Cited

U.S. PATENT DOCUMENTS

2013/0311561 A1    11/2013   Ku et al.
2014/0188937 A1*    7/2014   Kiefer ..................... G06F 21/10
                                                              707/781
(Continued)

FOREIGN PATENT DOCUMENTS

CN        1991824 A      7/2007
CN      104135685 A     11/2014
(Continued)

OTHER PUBLICATIONS

Youtube, 2014-2017, Google, p. 1-6; Tutorials with GS, Updated YouTube layout 2017 Dark Mode—How to get Dark YouTube | YouTube Dark Version, posted Apr. 15, 2017, p. 1-4; and Navigating the Ancestry YouTube Channel | Ancestry, posted Oct. 21, 2014, p. 5-6; (Year: 2017).*
(Continued)

*Primary Examiner* — Andrey Belousov
(74) *Attorney, Agent, or Firm* — BakerHostetler (57) ABSTRACT

A method, device, terminal equipment and a computer-readable storage medium for synchronous display of video information are provided. The method includes: displaying user dimension cross slip lists corresponding to at least one followee in a followee information display interface; jumping to a video playing interface to play a selected video according to the selection of the video in a user dimension cross slip list corresponding to a first followee; playing other videos except the selected video in the video playing interface in a sliding manner according to a sliding operation detected in the video playing interface; and jumping to the
(Continued)

followee information display interface to display a user dimension cross slip list corresponding to a second followee according to a page jump instruction detected in the video playing interface; the second followee is a followee corresponding to the video played in the video playing interface before page jump.

19 Claims, 5 Drawing Sheets

(51) Int. Cl.
　　*G06F 3/0485*　　(2022.01)
　　*H04N 21/422*　　(2011.01)
　　*H04N 21/472*　　(2011.01)
　　*H04N 21/478*　　(2011.01)
　　*H04N 21/485*　　(2011.01)

(52) U.S. Cl.
　　CPC . *H04N 21/42204* (2013.01); *H04N 21/47202* (2013.01); *H04N 21/478* (2013.01); *H04N 21/485* (2013.01)

(58) Field of Classification Search
　　CPC ........... H04N 21/2668; H04N 21/2743; H04N 21/41407; H04N 21/4788; G06F 3/0482; G06F 3/0485
　　See application file for complete search history.

(56) References Cited

U.S. PATENT DOCUMENTS

| | | | | |
|---|---|---|---|---|
| 2015/0356998 | A1* | 12/2015 | Schwesinger | ........ H04N 21/431 386/244 |
| 2017/0366861 | A1* | 12/2017 | Chung | ............... H04N 21/4825 |
| 2018/0167379 | A1 | 6/2018 | Wang | |

FOREIGN PATENT DOCUMENTS

| | | |
|---|---|---|
| CN | 104837034 A | 8/2015 |
| CN | 108241988 A | 7/2018 |
| CN | 108881994 A | 11/2018 |
| CN | 108984081 A | 12/2018 |
| CN | 108989297 A | 12/2018 |
| CN | 109120981 A | 1/2019 |
| CN | 109325146 A | 2/2019 |
| CN | 109996102 A | 7/2019 |

OTHER PUBLICATIONS

International Patent Application No. PCT/CN2020/073385; Int'l Search Report; dated Apr. 26, 2020; 2 pages.
Written Opinion for International Application No. PCT/CN2020/073385, mailed Apr. 26, 2020, 11 Pages.

* cited by examiner

METHOD, DEVICE, TERMINAL EQUIPMENT AND COMPUTER-READABLE STORAGE MEDIUM FOR SYNCHRONOUS DISPLAY OF VIDEO INFORMATION

CROSS-REFERENCE TO RELATED APPLICATION

The disclosure is the U.S. National Stage of International Application No. PCT/CN2020/073385, filed on Jan. 21, 2020, which claims the priority benefit of CN application No. 201910290046.4, filed on Apr. 11, 2019. The entirety of the above-mentioned patent application is hereby incorporated by reference herein and made a part of this specification.

TECHNICAL FIELD

The disclosure relates to a computer technology, and more particularly to a method, device, terminal equipment and computer-readable storage medium of synchronous display of video information.

BACKGROUND

With the increasing popularity of online short videos, more and more people use short video apps to watch or shoot short videos in their leisure time to enrich the entertainment life of the public.

In the related art, when watching videos uploaded by creator A on the video playing interface, a user cannot switch to videos uploaded by creator B. Therefore, after exiting the video playing interface playing the videos uploaded by creator A, the user is still at a position before video playing on the interface that shows videos uploaded according to creator dimensions, that is, still showing the videos uploaded by creator A, which can result in degrading watching experience of the user.

SUMMARY

Embodiments of the disclosure provide a method, device, terminal equipment and computer-readable storage medium of synchronous display of video information to synchronizing roll an internal streaming video and an external streaming video, which can improve experience of a user.

An embodiment of the disclosure provides a method for synchronous display of video information, including: displaying a user dimension cross slip list corresponding to at least one followee in a followee information display interface, jumping to a video playing interface to play a selected video based on selection of a video in a user dimension cross slip list corresponding to the first followee; playing other videos except the selected video in the video playing interface in a sliding manner based on a sliding operation detected in the video playing interface; and jumping to the followee information display interface to display a user dimension cross slip list corresponding to a second followee based on a page jump instruction detected in the video playing interface.

The at least one followee includes a first followee.

The second followee is a followee corresponding to a video played in the video playing interface before page jump.

An embodiment of the disclosure further provides a device for synchronous display of video information, including: a list display module, configured to display a user dimension cross slip list corresponding to at least one followee in a followee information display interface, an interface jumping module, configured to jump to a video playing interface to play a selected video based on selection of a video in a user dimension cross slip list corresponding to the first followee; a video playing module, configured to play other videos except the selected video in the video playing interface in a sliding manner based on a sliding operation detected in the video playing interface; and a jump display module, configured to jump to the followee information display interface to display a user dimension cross slip list corresponding to a second followee based on a page jump instruction detected in the video playing interface.

The at least one followee includes a first followee.

The second followee is a followee corresponding to a video played in the video playing interface before page jump.

An embodiment of the disclosure further provides a terminal equipment, including: one or more processing devices; and a storage device for storing one or more programs.

When the one or more programs are executed by the one or more processing devices, the one or more processing devices implement the method for synchronous display of video information according to any embodiment of the disclosure.

An embodiment of the disclosure further provides a computer-readable storage medium on which computer programs are stored. The computer programs, when executed by a processing device, implement the method for synchronous display of video information according to any embodiment of the disclosure.

DETAILED DESCRIPTION OF PREFERRED EMBODIMENTS

The disclosure will be further illustrated in detail with reference to embodiments and drawings therewith. Conceivably, specific embodiments described herein are only used to explain the disclosure, and not to limit the disclosure. It should also be noted that, for convenience of description, only some structures related to the disclosure are shown in the drawings, but not all structures.

In the following embodiments, optional features and examples are provided in each embodiment. Multiple features described in the embodiments can be combined to form multiple options, and each numbered embodiment should not be regarded as only one technical solution.

First Embodiment

Figure 1A:
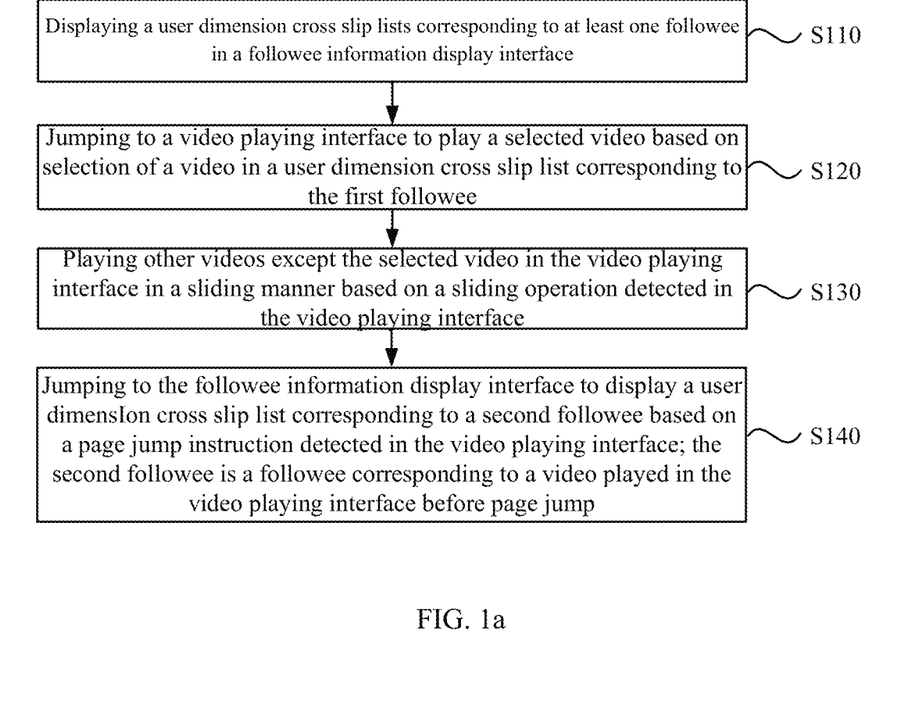
FIG. 1a is a schematic flowchart of a method for synchronous display of video information provided by a first embodiment of the disclosure.

FIG. 1a is a schematic flowchart of a method for synchronous display of video information provided by a first embodiment of the disclosure. The method can be applied to synchronous display of internal streaming videos and external streaming videos, which can be executed by terminal equipment such as a mobile phone or a tablet computer installing short video apps. The method includes the following steps.

S110, on a followee information display interface, user dimension cross slip lists corresponding to at least one followee are displayed. The at least one followee can include a first followee.

In the embodiment, a user can login a short video application (app) with the registered account and password, and watch or post short videos on the app. Besides, the user can also follow the creators of videos that he/she is interested in and add the creators to a followee list as followees, so that when the added followees post a new video, the video can be shown to the user in time as an updated video for the user to watch.

In one embodiment, in a short video app, when uploaded videos are displayed according to creator dimensionalities, the user can click on a video uploaded by a certain creator to enter a video playing interface to play the video, and slide up and down to view other displayed videos uploaded by the creator. The videos loaded on an interface where uploaded videos are displayed according to creator dimensionalities are external streaming videos, and the videos played on the video playing interface are internal streaming videos corresponding to the external streaming videos.

In the related art, the updated videos of all followees are displayed together. For example, when the user has multiple followees and each followee has posted new videos since the user opened the app last time, then all the updated videos of each followee are displayed according to updating time and an identifier of the followee is annotated under each corresponding updated video. Such a display mode not only reduces the display efficiency of updated videos, but also makes it inconvenient for the user to view because all the updated videos of the video creators, namely the followees, are displayed together. If the user only wants to watch updated videos of a certain followee, the user has to look through all the updated videos one by one to find the updated videos of a target followee, thus affecting the watching experience of the user.

In the embodiment, different user dimension cross slip lists are set for different followees, so as to display the updated videos of different followees separately in the followee information display interface. The user dimension cross slip lists can be cross slip lists correspondingly generated in terms of each followee; different cross slip lists can correspond to different followees, and the acquired updated videos corresponding to a followee can be displayed in the cross slip list corresponding to the followee. The user can perform cross slip operation on the cross slip list corresponding to the followee to browse the updated videos recently uploaded by the followee.

In the embodiment, the updated videos corresponding to the followee can be videos that the user has never clicked on, videos posted by the followee within a preset time period, or a preset number of videos recently posted by the followee, which will not be limited hereto.

In one embodiment, displaying the user dimension cross slip lists corresponding to the at least one followee in the followee information display interface includes: acquiring updated videos corresponding to each followee in the at least one followee in the followee list; generating a user dimension cross slip list corresponding to each followee according to the acquired updated videos corresponding to each followee; and displaying the user dimension cross slip list corresponding to each followee in the followee information display interface.

Figure 1B:
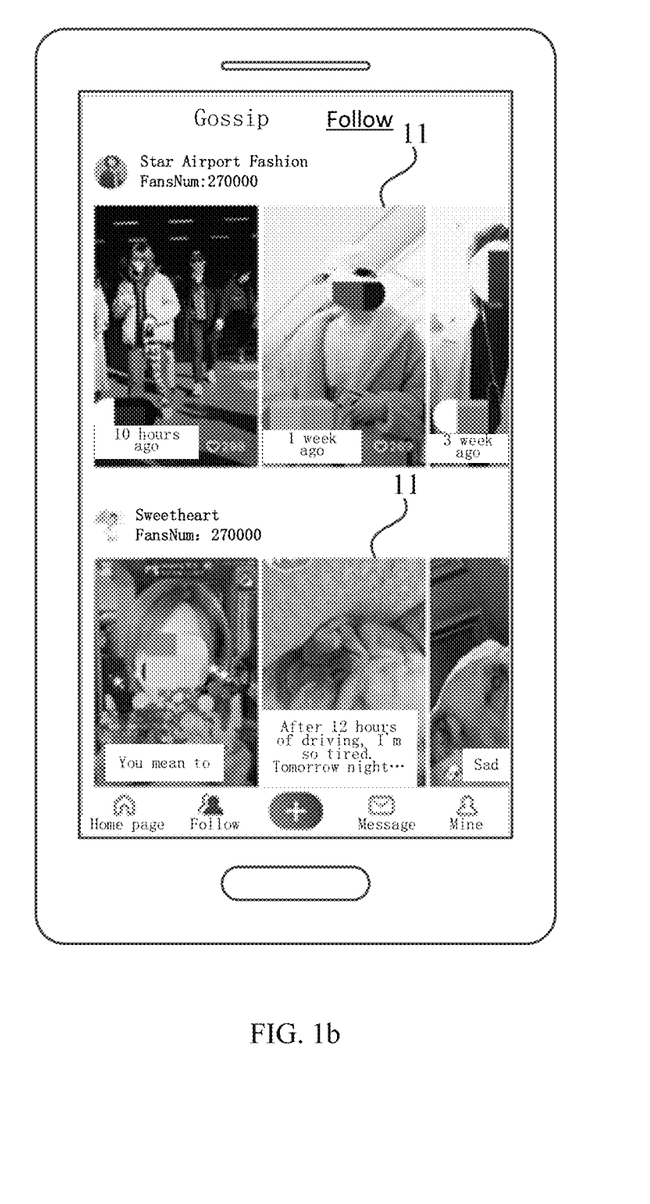
FIG. 1b is a schematic view of a display interface of user dimension cross slip lists applicable to the first embodiment of the disclosure.

Exemplarily, in order to improve the display efficiency of videos in the followee information display interface, the embodiment can first obtain one or more followees from the followee list created by the user, download a set number of recently posted updated videos corresponding to each followee from a server, and then display videos in terms of different followees by adding each video to the user dimension cross slip list of the corresponding followee, with the display form as shown in FIG. 1b. Different users can generate different user dimension cross slip lists 11, and the user can select to watch the updated video he/she is interested in from updated videos set by cross slip the user dimension cross slip list 11 corresponding to the target followee.

S120, according to the selection of the video in the user dimension cross slip list corresponding to the first followee, a video selected from a video playing interface is played.

In the embodiment, the updated videos can be played according to the selection of the user. In one embodiment, the video playing interface can be separately provided to play the video, in the user dimension cross slip list, selected by the user in full screen. Exemplarily, if the app user clicks on an updated video in the user dimension cross slip list corresponding to the first followee, it can switch from the current followee information display interface to the video playing interface to play the updated video in full screen, thus allowing the user to watch the video conveniently.

In one embodiment, after switching the video playing interface to play the selected video according to the selection of the video in the user dimension cross slip list corresponding to the first followee, the method further includes: loading first additional updated videos corresponding to at least one new followee not loaded into the followee list according to an additional followee loading request detected in the video playing interface; generating additional user dimension cross slip lists corresponding to the at least one new followee according to the loaded first additional updated videos; updating the followee information display interface according to the additional user dimension cross slip lists; and providing the first additional updated videos to the video playing interface, so that the first additional updated videos can be played in the video playing interface in a sliding manner.

Exemplarily, when the additional followee loading request is detected in the video playing interface, the loading of the first additional updated videos corresponding to other part or all of the followees that have been followed but not loaded can be triggered in the followee information display interface, and at the same time, by adding each video in the first additional updated videos to a corresponding newly created cross slip list, additional user dimension cross slip lists corresponding to the loaded new followees can be generated and displayed in front of or behind the previously loaded user dimension cross slip lists corresponding to the followees; finally, from the external streaming video data in the updated followee information display interface, the internal streaming video data corresponding to the first additional updated videos are provided to the video playing interface, so that the first additional updated videos can be played in a sliding manner. The way of sliding-playing the first additional updated videos can be playing videos in turn, or playing the video corresponding to the slip operation of the user.

In one embodiment, before loading the first additional updated videos corresponding to the at least one new followee not loaded into the followee list according to the additional followee loading request detected in the video playing interface, the method further includes: triggering the generation of the additional followee loading request when it is determined that the followee corresponding to the video played in the video playing interface is at a set position in a loaded followee set; or triggering the generation of the additional followee loading request when it is determined that the followee corresponding to the video played in the video playing interface is a last followee in the loaded followee set, and a video switching instruction for switching to a next followee is detected in the video playing interface.

Exemplarily, there can be two situations as to when the generation of the additional followee loading request can be triggered.

In one case, when the followee corresponding to the video currently played in the video playing interface is already within a setting position range in the loaded followee set in the followee list, such as a penultimate followee in the loaded followee set, the generation of the additional followee loading request can be automatically triggered.

In the other case, when the followee corresponding to the video currently played in the video playing interface is already the last one in the loaded followee set in the followee list; that is, the currently played video is a video of the last followee, the generation of the additional followee loading request can be automatically triggered.

In one embodiment, after switching to the video playing interface to play the selected video according to the selection of the video in the user dimension cross slip list corresponding to the first followee, the method further includes: loading at least one second additional updated video of the followee corresponding to the video played in the video playing interface according to the additional video loading request detected in the video playing interface, so that the second additional updated videos can be played in the video playing interface in a sliding manner.

The second additional updated videos can be all or part of the videos recently uploaded by the followee corresponding to the video currently played in the video playing interface, except the videos included in the corresponding user dimension cross slip list. Correspondingly, the additional video loading request can be a request generated by being triggered by the user on the video playing interface, and is used to request to load other videos uploaded by the followee corresponding to the video currently played in the video playing interface, except the videos included in the user dimension cross slip list.

Exemplarily, in the video playing interface, whenever the user triggers the additional video loading request, for example, when the user watches the last video loaded into the user dimension cross slip list corresponding to the current followee, the second additional updated videos corresponding to the current followee can be loaded accordingly, so that the user can watch other videos that have not been loaded before and are uploaded by the current followee, without the need to exit the current video playing interface and enter a homepage of the current followee to watch other videos, and seamless switching between preloaded videos and additional videos is realized in the video playing interface, thus simplifying the operation process and improving watching experience of the user.

In one embodiment, the loading of the first additional updated videos is realized by a first pager, and the loading of the second additional updated videos is realized by a second pager.

External streaming video data, such as video data loaded into the followee information display interface, i.e., the first additional updated videos, and internal streaming video data, such as videos loaded into the video playing interface, i.e., the second additional updated videos, are implemented by using different pagers, so that the loading of the internal streaming video data does not depend on the loading of the external streaming video data, thus enabling the data on the server to be pulled in the video playing interface and the second additional updated videos not loaded into the external streaming video data to be loaded.

S130, other videos except the selected video in the video playing interface are played in a sliding manner according to a sliding operation detected in the video playing interface.

In one embodiment, in the video playing interface, the user can slide up and down to play a plurality of videos in the user dimension cross slip list of the first followee. For example, when the sliding operation input by the user in the video playing interface is sliding up, it can switch to a next video adjacent to the currently played video in the user dimension cross slip list of the first followee; and when the sliding operation input by the user in the video playing interface is sliding down, it can be switched to a previous video adjacent to the currently played video in the user dimension cross slip list of the first followee.

It should be emphasized that, in addition to the above situations, the user can also slide to the videos of other loaded followees (such as the second followee) except the first followee by sliding up and down and user switching, so that the user can watch the videos of other followees directly without exiting the video playing interface.

S140, it is redirected to the followee information display interface to display the user dimension cross slip list corresponding to the second followee according to a page jump instruction detected in the video playing interface; the second followee is a followee corresponding to the video played in the video playing interface before page jump.

In the embodiment, the page jump instruction can be an instruction for instructing the user to exit the current video playing interface, such as an instruction generated by triggering when the user clicks on an exit icon or return icon in the video playing interface. When the page jump instruction is received, it can jump back to the followee information display interface from the currently displayed video playing interface, so that the user can perform other browsing and selection operations.

In the related art, after returning from the video playing interface to the followee information display interface, a display position of the followee information display interface is still the position before entering the video playing interface, for example, still at the position of the first followee, but before page jump, the videos of the second followee may have already been played in the video playing interface; as a result, the user has to manually find the position of the second followee before continuing browsing and selecting unwatched followees, thus reducing the watching experience of the user.

In the embodiment, when it is switched to the followee information display interface, the followee corresponding to the video currently played in the video playing interface before jumping, i.e., the second followee, is automatically located in advance, so as to display the user dimension cross slip list corresponding to the followee, thus avoiding manual search and locating by the user and allowing the user to continue browsing and selecting videos of unwatched followees, thereby improving watching experience of the user.

According to the technical solution of the embodiment, the user dimension cross slip lists corresponding to the at least one followee are displayed in the followee information display interface, then according to the selection of the video in the user dimension cross slip list corresponding to the first followee, it jumps to the video playing interface to play the selected video, then other videos except the selected video are played in the video playing interface according to the sliding operation detected in the video playing interface, and finally, according to the page jump instruction detected in the video playing interface, it jumps to the followee information display interface to display the user dimension cross slip list corresponding to the second followee; the second followee is the followee corresponding to the video played in the video playing interface before page jump. By adjusting to the position of the followee corresponding to the currently played video in time when exiting the video playing interface, the problem of the related art that the watching experience of the user is poor because interface content displayed when exiting is still what was displayed when entering is solved, the synchronous scrolling of the internal streaming videos and external streaming videos is realized, and watching experience of the user is improved.

On the basis of the multiple alternatives in the above embodiments, in one embodiment, the followee information display interface is pre-registered as a listener of a video playing port in the video playing interface. Under the condition that the video playing port in the video playing interface is exited, the second followee corresponding to the video played in the video playing interface before exiting is sent to the followee information display interface, so that the followee information display interface can obtain the second followee.

In order to ensure the synchronous scrolling of the internal streaming videos and external streaming videos, the synchronous scrolling of the external streaming videos can be clearly realized with the thinking of responsive programming, which features streaming data transmission and is based on the publisher-subscriber mode, and when a subscription signal of the user changes, the data can be released by broadcasting to a subscriber.

Exemplarily, the followee information display interface can be registered as a listener of a video playing port exposed by the video playing interface, so that the followee information display interface can obtain the information of the currently played video when the video playing interface exits, and then obtain the corresponding followee according to the video information, such as the second followee corresponding to the currently played video, so as to locate the user dimension cross slip list corresponding to the second followee in the followee information display interface for display. The listener can be a UI view controller of the user dimension cross slip lists in the followee information display interface.

Second Embodiment

Figure 2:
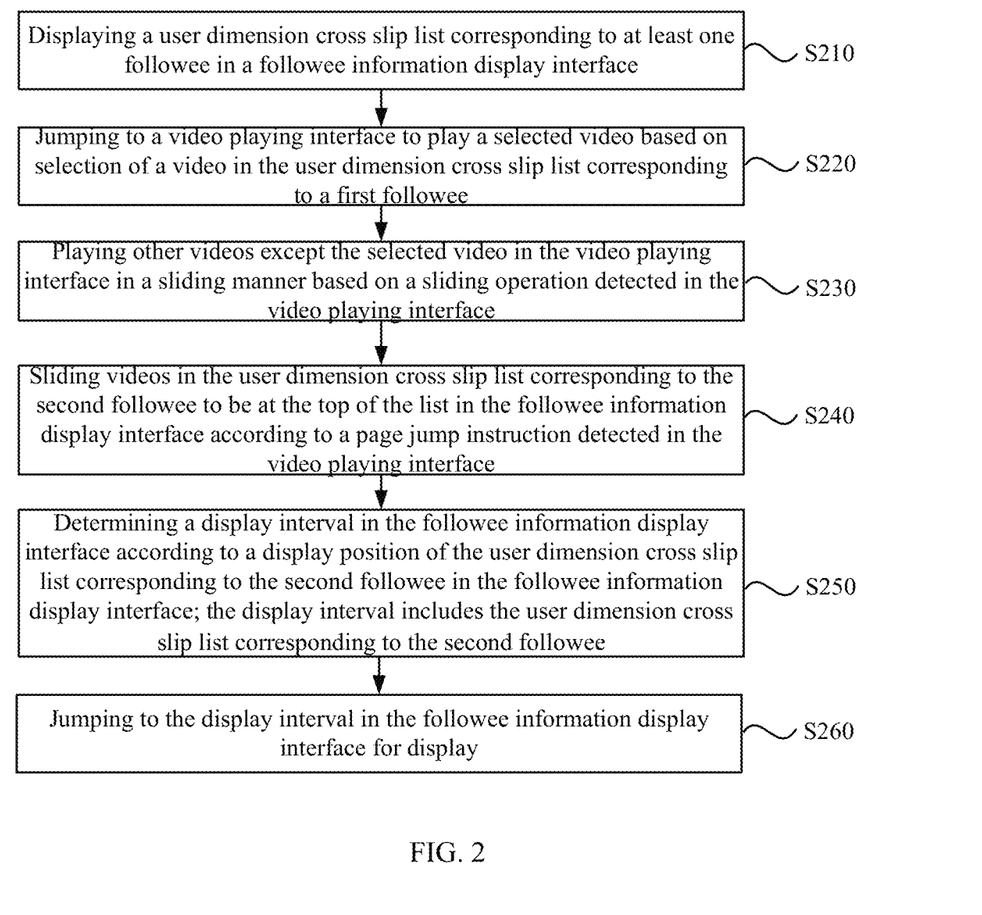
FIG. 2 is a schematic flowchart of a method for synchronous display of video information provided by a second embodiment of the disclosure.

FIG. 2 is a schematic flowchart of a method for synchronous display of video information provided by a second embodiment of the disclosure. The embodiment provides an optional method for synchronous display of video information based on the multiple alternatives in the above embodiment. In this optional method for synchronous display of video information, jumping to a followee information display interface to display a user dimension cross slip list corresponding to a second followee according to a page jump instruction detected in a video playing interface includes: sliding videos in the user dimension cross slip list corresponding to the second followee to be at the top of the list in the followee information display interface according to the page jump instruction detected in the video playing interface; determining a display interval in the followee information display interface according to a display position of the user dimension cross slip list corresponding to the second followee in the followee information display interface; the display interval includes the user dimension cross slip list corresponding to the second followee; and jumping to the display interval in the followee information display interface for display. The method includes the following steps.

S210, user dimension cross slip lists corresponding to at least one followee can be displayed in a followee information display interface.

S220, it is redirected to a video playing interface to play a selected video according to the selection of the video in the user dimension cross slip list corresponding to a first followee.

S230, other videos except the selected video in the video playing interface are played in a sliding manner according to a sliding operation detected in the video playing interface.

S240, videos in the user dimension cross slip list corresponding to the second followee are slipped to be at the top of the list in the followee information display interface according to the page jump instruction detected in the video playing interface.

In the embodiment, the page jump instruction can be received in the video playing interface, and when jumping to the followee information display interface according to the instruction, the second followee corresponding to the video being played before the video playing interface is exited is located, and the user dimension cross slip list corresponding to the second followee is displayed. The videos in the user dimension cross slip list are slid to the top of the list by default, so that the user can browse and select the videos of the second followee.

To give a practical example, if the video currently played in the video playing interface is a video of a followee A before the user clicks on the exit icon of the video playing interface, then after the user clicks on the exit icon of the video playing interface and triggers the generation of the page jump instruction corresponding to the video playing interface, a user dimension cross slip list corresponding to the followee A is located in the followee information display interface, so as to show the user dimension cross slip list corresponding to the followee A to the user when jumping from the video playing interface to the followee information display interface; and at the same time, videos in the user dimension cross slip list corresponding to the followee A are slid to the top of the list to be displayed to the user.

S250, a display interval in the followee information display interface is determined according to a display position of the user dimension cross slip list corresponding to the second followee in the followee information display interface; the display interval includes the user dimension cross slip list corresponding to the second followee.

In the process of displaying the user dimension cross slip list corresponding to the second followee to the user, the user dimension cross slip list corresponding to the second followee can be displayed at an appropriate position of the followee information display interface for the user to browse.

In one embodiment, the display position of the user dimension cross slip list corresponding to the second followee in the followee information display interface, such as upper and lower boundary position values, minus and/or plus a set value can be taken as the display interval corresponding to the list, so that the user dimension cross slip list corresponding to the second followee can be displayed when jumping to the display interval in the followee information display interface.

To give a practical example, the upper boundary position value and the lower boundary position value of the user dimension cross slip list corresponding to the second followee in the followee information display interface can be obtained respectively, and then the upper boundary position value minus the set value is taken as the upper boundary position value of the display interval, and the lower boundary position value plus the set value is taken as the lower boundary position value of the display interval, so that the display interval can be determined.

S260, it is jumped to the display interval in the followee information display interface for display.

Exemplarily, after the display interval is determined, the followee information display interface can jump from the current display position to the determined display interval. In one embodiment, if the display interval matches the screen in size, the display interval can be directly displayed. If the display interval is smaller than or larger than the screen, the display interval can be displayed after being placed at the top, that is, display starts from the upper boundary position of the display interval, so as to ensure that the user dimension cross slip list corresponding to the second followee can be displayed in the current display interface.

According to the technical solution of the embodiment, on the basis of the above embodiments, the videos in the user dimension cross slip list corresponding to the second followee are slid to be at the top of the list in the followee information display interface according to the page jump instruction detected in the video playing interface, and the display interval is determined in the followee information display interface according to the display position of the user dimension cross slip list corresponding to the second followee in the followee information display interface, so as to jump to the display interval for display. By adjusting to the position of the followee corresponding to the currently played video in time when exiting the video playing interface, the synchronous scrolling of the internal streaming videos and external streaming videos is realized, and watching experience of the user is improved.

On the basis of the above embodiment, in order to further improve watching experience of the user, in one embodiment, jumping to the followee information display interface to display the user dimension cross slip list corresponding to the second followee according to the page jump instruction detected in the video playing interface further includes: playing a transition animation indicating the transition from the video playing interface to the top video in the user dimension cross slip list corresponding to the second followee.

For example, the transition animation can gradually shrink from the video playing interface, and finally disappear at the top video in the user dimension cross slip list corresponding to the second followee, so that the user can quickly find the display position of the lateral sliding list in which the currently played video is located before exiting the video playing interface, thus bringing better visual experience to the user.

Third Embodiment

Figure 3:
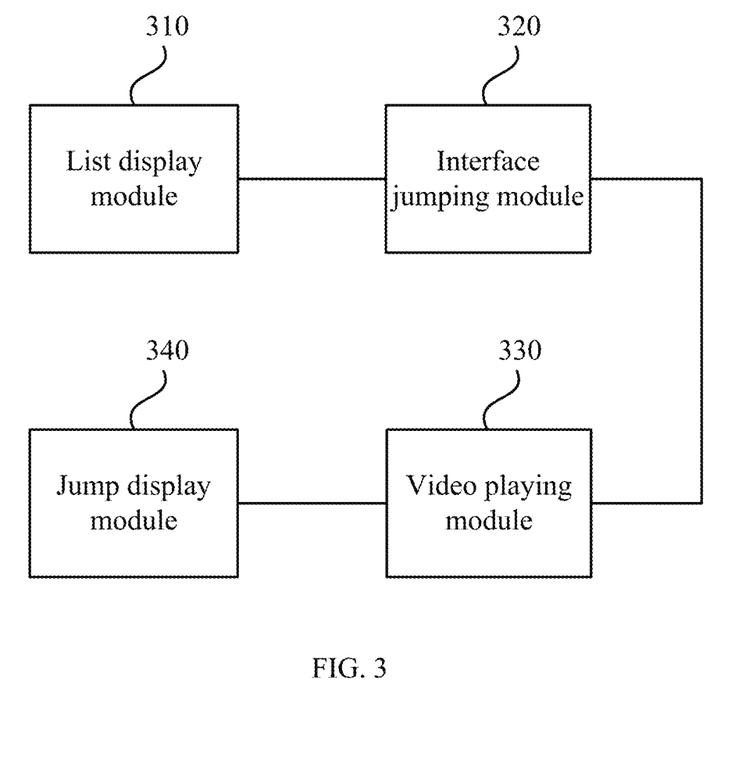
FIG. 3 is a structural schematic view of a device for synchronous display of video information provided by a third embodiment of the disclosure.

FIG. 3 is a structural schematic diagram of a device for synchronous display of video information provided in a third embodiment of the disclosure. Referring to FIG. 3, the device for synchronous display of video information includes a list display module 310, an interface jumping module 320, a video playing module 330 and a jump display module 340, which are described below.

The list display module 310 is configured to display user dimension cross slip lists corresponding to at least one followee in a followee information display interface; the at least one followee includes a first followee.

The interface jumping module 320 is configured to jump to a video playing interface to play a selected video according to the selection of the video in the user dimension cross slip list corresponding to the first followee.

The video playing module 330 is configured to play other videos except the selected video in the video playing interface in a sliding manner according to a sliding operation detected in the video playing interface.

The jump display module 340 is configured to jump to the followee information display interface to display the user dimension cross slip list corresponding to a second followee according to a page jump instruction detected in the video playing interface; the second followee is a followee corresponding to the video played in the video playing interface before page jump.

According to the device for synchronous display of video information provided in the embodiment, the user dimension cross slip lists corresponding to the at least one followee are displayed in the followee information display interface, then according to the selection of the video in the user dimension cross slip list corresponding to the first followee, it jumps to the video playing interface to play the selected video, then other videos except the selected video are played in the video playing interface according to the sliding operation detected in the video playing interface, and finally, according to the page jump instruction detected in the video playing interface, it jumps to the followee information display interface to display the user dimension cross slip list corresponding to the second followee; the second followee is the followee corresponding to the video played in the video playing interface before page jump. By adjusting to the position of the followee corresponding to the currently played video in time when exiting the video playing interface, the problem of the related art that watching experience of the user is poor because interface content displayed when exiting is still what was displayed when entering is solved, the synchronous scrolling of the internal streaming videos and external streaming videos is realized, and watching experience of the user is improved.

In one embodiment, the list display module 310 can be configured to: acquire updated videos corresponding to each followee in the at least one followee in the followee list; generate a user dimension cross slip list corresponding to each followee according to the acquired updated videos corresponding to each followee; and display the user dimension cross slip list corresponding to each followee in the followee information display interface.

In one embodiment, the device can further include an additional user loading module, an additional list generating module, a display interface updating module and a video sliding-playing module.

The additional user loading module is configured to load first additional updated videos corresponding to at least one new followee not loaded into the followee list according to an additional followee loading request detected in the video playing interface after jumping to the video playing interface to play the selected video according to the selection of the video in the user dimension cross slip list corresponding to the first followee.

The additional list generating module is configured to generate additional user dimension cross slip lists corresponding to the at least one new followee according to the loaded first additional updated videos.

The display interface updating module is configured to update the followee information display interface according to the additional user dimension cross slip lists.

The video sliding-playing module is configured to provide the first additional updated videos to the video playing interface, so that the first additional updated videos can be played in the video playing interface in a sliding manner.

In one embodiment, the device can further include a first request triggering module and a second request triggering module.

The first request triggering module is configured to trigger the generation of the additional followee loading request when it is determined that the followee corresponding to the video played in the video playing interface is at a set position in a loaded followee set before loading the first additional updated videos corresponding to the at least one new followee not loaded into the followee list according to the additional followee loading request detected in the video playing interface.

The second request triggering module is configured to trigger the generation of the additional followee loading request when it is determined that the followee corresponding to the video played in the video playing interface is a last followee in the loaded followee set, and a video switching instruction for switching to a next followee is detected in the video playing interface.

In one embodiment, the device can further include an additional video loading module.

The additional video loading module is configured to load at least one second additional updated video of the followee corresponding to the video played in the video playing interface according to the additional video loading request detected in the video playing interface, so that the second additional updated videos can be played in the video playing interface in a sliding manner after jumping to the video playing interface to play the selected video according to the selection of the video in the user dimension cross slip list corresponding to the first followee.

In one embodiment, the followee information display interface can be pre-registered as a listener of a video playing port in the video playing interface.

Under the condition that the video playing port in the video playing interface is exited, the second followee corresponding to the video played in the video playing interface before exiting is sent to the followee information display interface, so that the followee information display interface can obtain the second followee.

In one embodiment, the jump display module 340 can be configured to: slide videos in the user dimension cross slip list corresponding to the second followee to be at the top of the list in the followee information display interface according to the page jump instruction detected in the video playing interface; determine a display interval in the followee information display interface according to a display position of the user dimension cross slip list corresponding to the second followee in the followee information display interface; the display interval includes the user dimension cross slip list corresponding to the second followee; and jump to the display interval in the followee information display interface for display.

In one embodiment, the device can further include a transition animation playing module.

The transition animation playing module is configured to play a transition animation indicating the transition from the video playing interface to the top video in the user dimension cross slip list corresponding to the second followee while jumping to the followee information display interface to display the user dimension cross slip list corresponding to the second followee according to the page jump instruction detected in the video playing interface.

In one embodiment, the loading of the first additional updated videos can be realized by a first pager, and the loading of the second additional updated videos can be realized by a second pager.

The above product can execute the method provided by any embodiment of the disclosure, and has corresponding functional modules and effects for executing the method.

Fourth Embodiment

Figure 4:
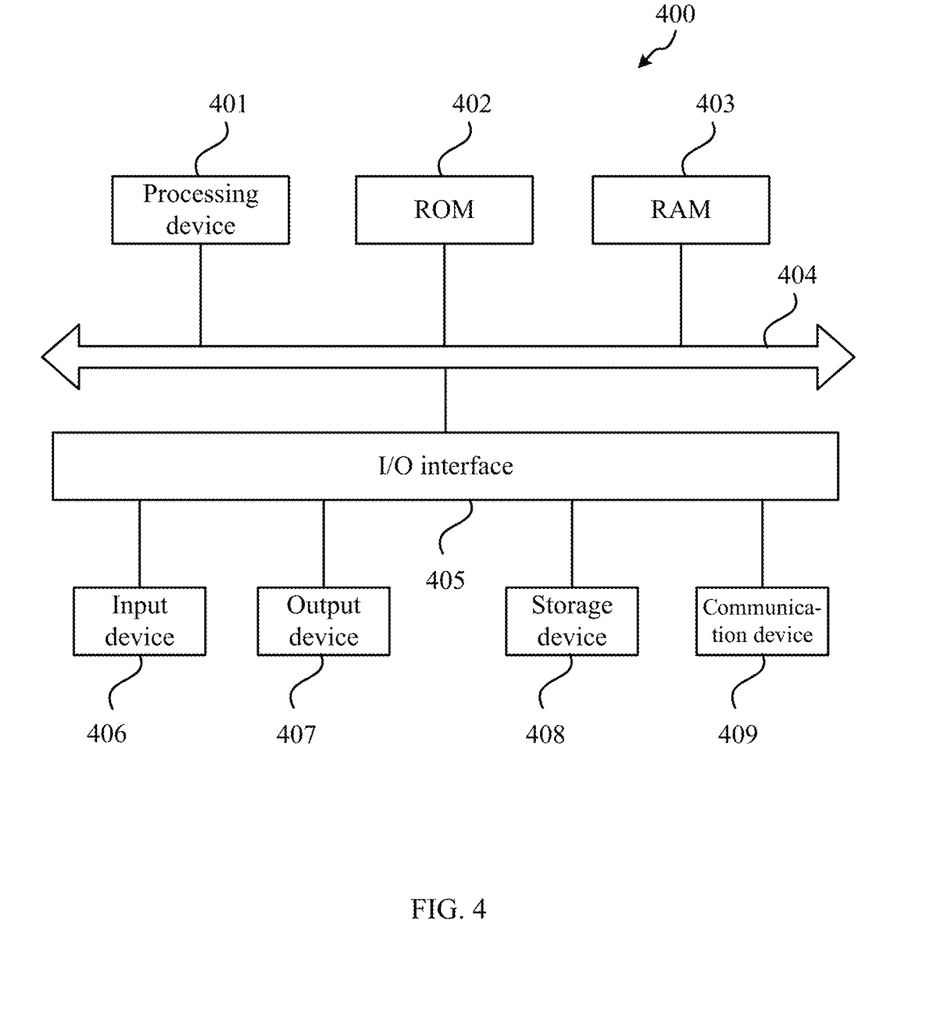
FIG. 4 is a schematic view of a hardware structure of a terminal equipment provided by a fourth embodiment of the disclosure.

Referring now to FIG. 4, a structural schematic diagram of terminal equipment 400 suitable for implementing an embodiment of the disclosure is shown. The terminal equipment 400 in the embodiment of the disclosure can include, but is not limited to, mobile terminals such as a mobile phone, a notebook computer, a digital broadcast receiver, a personal digital assistant (PDA), a Pad, a portable media player (PMP) and a vehicle-mounted terminal (e.g., vehicle-mounted navigation terminal), and fixed terminals such as a digital TV and a desktop computer. The terminal equipment shown in FIG. 4 is only an example, and should not bring any restrictions on the functions and application scope of the embodiments of the disclosure.

As shown in FIG. 4, the terminal equipment 400 can include a processing device (e.g., central processing unit, graphics processor, etc.) 401, which can perform various appropriate actions and processing according to a program stored in a read-only memory (ROM) 402 or a program loaded into a random access memory (RANI) 403 from a storage device 408. In the RAM 403, various programs and data required for the operation of the terminal equipment 400 are also stored. The processing device 401, the ROM 402, and the RAM 403 are connected through a bus 404. An Input/output (I/O) interface 405 is also connected to the bus 404.

Generally, the following devices can be connected to the I/O interface 405: an input device 406 such as a touch screen, a touch pad, a keyboard, a mouse, a camera, a microphone, an accelerometer and a gyroscope; an output device 407 such as a liquid crystal display (LCD), a speaker and a vibrator; a storage device 408 such as a magnetic tape and a hard disk; and a communication device 409. The communication device 409 can allow the terminal equipment 400 to perform wireless or wired communication with other equipment to exchange data. Although FIG. 4 shows the terminal equipment 400 with various devices, it should be understood that it is not required to implement or provide all the devices shown. More or fewer devices may alternatively be implemented or provided.

Particularly, according to the embodiments of the disclosure, the processes described above with reference to the flowcharts may be implemented as computer software programs. For example, the embodiments of the disclosure include a computer program product comprising a computer program carried by a computer-readable medium, and the computer program contains program codes for executing the method shown in the flowcharts. In such embodiment, the computer program can be downloaded and installed from a network through the communication device 409, or installed from the storage device 408, or installed from the ROM 402. When the computer program is executed by the processing device 401, the above functions defined in the method of the embodiments of the disclosure are executed.

It should be noted that the above-mentioned computer-readable medium can be a computer-readable signal medium or a computer-readable storage medium or any combination of the two. The computer-readable storage medium may be, for example, but not limited to, an electrical, magnetic, optical, electromagnetic, infrared or semiconductor system, device or component, or any combination of the above. More specific examples of the computer-readable storage medium may include, but are not limited to, an electrical connector with one or more wires, a portable computer disk, a hard disk, an RAM, an ROM, an electrically erasable programmable read only memory (EPROM) or flash memory, an optical fiber, a portable compact disc read-only memory (CD-ROM), an optical storage device, a magnetic storage device, or any suitable combination of the above. In the disclosure, the computer-readable storage medium can be any tangible medium containing or storing a program, which can be used by or in combination with an instruction execution system, device or component. In the disclosure, the computer-readable signal medium can include a data signal propagated in a baseband or as part of a carrier wave, in which computer-readable program codes are carried. This propagated data signal can take various forms, including but not limited to an electromagnetic signal, an optical signal or any suitable combination of the above. The computer-readable signal medium can also be any computer-readable medium other than the computer-readable storage medium, and the computer-readable signal medium can send, propagate or transmit the program for use by or in connection with the instruction execution system, device or component. The program codes contained in the computer-readable medium can be transmitted by any suitable medium, including but not limited to electric wire, optical cable, radio frequency (RF) or any suitable combination of the above.

The computer-readable medium can be included in the terminal equipment, and can also exist alone without being assembled into the terminal equipment.

The computer-readable medium carries one or more programs, and when the one or more programs are executed by the terminal equipment, the terminal equipment is caused to: display user dimension cross slip lists corresponding to at least one followee in a followee information display interface; the at least one followee includes a first followee; jump to a video playing interface to play a selected video according to the selection of the video in the user dimension cross slip list corresponding to the first followee; play other videos except the selected video in the video playing interface in a sliding manner according to a sliding operation detected in the video playing interface; and jump to the followee information display interface to display the user dimension cross slip list corresponding to a second followee according to a page jump instruction detected in the video playing interface; the second followee is a followee corresponding to the video played in the video playing interface before page jump.

Computer program codes for performing the operations of the disclosure can be written in one or more programming languages or a combination thereof, including object-oriented programming languages such as Java, Smalltalk, C++, and conventional procedural programming languages such as "C" language or similar programming languages. The program code can be completely executed on a user computer, partially executed on a user computer, executed as an independent software package, partially executed on a user computer and partially executed on a remote computer, or completely executed on a remote computer or server. In a case involving a remote computer, the remote computer can be connected to a user computer through any kind of network including a local area network (LAN) or a wide area network (WAN), or can be connected to an external computer (e.g., connected through the Internet using an Internet service provider).

The flowcharts and block diagrams in the drawings show the architectures, functions and operations of possible implementations of systems, methods and computer program products according to various embodiments of the disclosure. In this regard, each block in the flowchart or block diagram can represent a module, a program segment or part of a code that contains one or more executable instructions for implementing a specified logical function. It should also be noted that in some alternative implementations, the functions noted in the blocks can also occur in a different order from those noted in the drawings. For example, two consecutive blocks can actually be executed in substantially parallel, and sometimes they can be executed in reverse order, depending on the functions involved. It should also be noted that each block in the block diagrams and/or flowcharts, and combinations of blocks in the block diagrams and/or flowcharts, can be implemented with dedicated hardware-based systems that perform specified functions or actions, or can be implemented with combinations of dedicated hardware and computer instructions.

The modules or units described in the embodiments of the disclosure can be implemented by software or hardware. The name of a module or unit does not constitute a limitation to the module or unit itself under certain circumstances. For example, the list display module can also be described as "a module for displaying user dimension cross slip lists corresponding to at least one followee in a followee information display interface".

What is claimed is:

1. A method for synchronous display of video information, comprising:
    displaying at least one user dimension cross slip list corresponding to at least one followee in a followee information display interface, wherein the at least one followee comprises a first followee, wherein the at least one user dimension cross slip list is configured to display videos uploaded by the at least one followee who is at least one video creator followed by a user, and wherein different user dimension cross slip lists correspond to different video creators followed by the user;
    jumping from the followee information display interface to a video playing interface to play a video based on a selection of the video in a first user dimension cross slip list corresponding to the first followee;
    playing another video in the video playing interface in response to detecting a sliding operation in the video playing interface, wherein the other video corresponds to a second followee; and
    jumping back to the followee information display interface to display a second user dimension cross slip list corresponding to the second followee in response to detecting a page jump instruction in the video playing interface, wherein the jumping back to the followee information display interface to display a second user dimension cross slip list corresponding to the second followee comprises:
sliding videos in the second user dimension cross slip list to be top in list in the followee information display interface in response to the page jump instruction,
determining a display interval in the followee information display interface based on a display position of the second user dimension cross slip list in the followee information display interface, wherein the display interval comprises the second user dimension cross slip list, and
jumping to the display interval in the followee information display interface for display.

2. The method according to claim 1, wherein the displaying at least one user dimension cross slip list corresponding to at least one followee in a followee information display interface comprises:
acquiring updated videos corresponding to each followee in the at least one followee in a followee list;
generating a user dimension cross slip list corresponding to the each followee based on acquired updated videos corresponding to the each followee; and
displaying the user dimension cross slip list corresponding to each followee in the followee information display interface.

3. The method according to claim 1, wherein after the jumping to a video playing interface to play a selected video based on selection of a video in a first user dimension cross slip list corresponding to the first followee, the method further comprises:
loading first additional updated videos corresponding to at least one new followee not loaded into the followee list based on an additional followee loading request detected in the video playing interface;
generating additional user dimension cross slip lists corresponding to the at least one new followee based on the first additional updated videos have been loaded;
updating the followee information display interface based on the additional user dimension cross slip lists; and
providing the first additional updated videos to the video playing interface to enable the first additional updated videos to be played in the video playing interface in a sliding manner.

4. The method according to claim 3, wherein before the loading first additional updated videos corresponding to at least one new followee not loaded into the followee list based on an additional followee loading request detected in the video playing interface, the method further comprises:
triggering to generate the additional followee loading request when it is determined that a followee corresponding to the video played in the video playing interface is at a set position in a loaded followee set; or
triggering to generate the additional followee loading request when it is determined that a followee corresponding to the video played in the video playing interface is a last followee in a loaded followee set, and a video switching instruction for switching to a next followee is detected in the video playing interface.

5. The method according to claim 1, wherein after the jumping to a video playing interface to play a selected video based on selection of a video in a first user dimension cross slip list corresponding to the first followee, the method further comprises:
based on an additional video loading request detected in the video playing interface, loading at least one second additional updated video of the followee corresponding to the video played in the video playing interface to enable the at least one second additional updated video to be played in the video playing interface in a sliding manner.

6. The method according to claim 1,
wherein the followee information display interface is pre-registered as a listener of a video playing port in the video playing interface;
wherein under a condition that the video playing port in the video playing interface is exited, information indicative of the second followee corresponding to the video played in the video playing interface before exit is sent to the followee information display interface.

7. The method according to claim 1, wherein the jumping back to the followee information display interface to display a second user dimension cross slip list corresponding to the second followee based on a page jump instruction detected in the video playing interface further comprises:
playing a transition animation indicating a transition from the video playing interface to a top video in the second user dimension cross slip list corresponding to the second followee.

8. The method according to claim 5, wherein loading of first additional updated videos is realized by a first pager, and loading of the at least one second additional updated video is realized by a second pager.

9. A terminal equipment, comprising:
one or more processing devices; and a storage device for storing one or more programs; wherein when the one or more programs are executed by the one or more processing devices, the one or more processing devices perform operations, the operations comprising:
displaying at least one user dimension cross slip list corresponding to at least one followee in a followee information display interface, wherein the at least one followee comprises a first followee, wherein the at least one user dimension cross slip list is configured to display videos uploaded by the at least one followee who is at least one video creator followed by a user, and wherein different user dimension cross slip lists correspond to different video creators followed by the user;
jumping from the followee information display interface to a video playing interface to play a video based on a selection of the video in a first user dimension cross slip list corresponding to the first followee;
playing another video in the video playing interface in response to detecting a sliding operation in the video playing interface, wherein the other video corresponds to a second followee; and
jumping back to the followee information display interface to display a second user dimension cross slip list corresponding to the second followee in response to detecting a page jump instruction in the video playing interface, wherein the jumping back to the followee information display interface to display a second user dimension cross slip list corresponding to the second followee comprises:
sliding videos in the second user dimension cross slip list to be top in list in the followee information display interface in response to the page jump instruction,
determining a display interval in the followee information display interface based on a display position of the second user dimension cross slip list in the followee information display interface, wherein the display interval comprises the second user dimension cross slip list, and jumping to the display interval in the followee information display interface for display.

10. The method according to claim 2, wherein after the jumping to a video playing interface to play a selected video based on selection of a video in a first user dimension cross slip list corresponding to the first followee, the method further comprises:
loading first additional updated videos corresponding to at least one new followee not loaded into the followee list based on an additional followee loading request detected in the video playing interface;
generating additional user dimension cross slip lists corresponding to the at least one new followee based on the first additional updated videos have been loaded;
updating the followee information display interface based on the additional user dimension cross slip lists; and
providing the first additional updated videos to the video playing interface to enable the first additional updated videos to be played in the video playing interface in a sliding manner.

11. The method according to claim 10, wherein before the loading first additional updated videos corresponding to at least one new followee not loaded into the followee list based on an additional followee loading request detected in the video playing interface, the method further comprises:
triggering to generate the additional followee loading request when it is determined that a followee corresponding to the video played in the video playing interface is at a set position in a loaded followee set; or
triggering to generate the additional followee loading request when it is determined that a followee corresponding to the video played in the video playing interface is a last followee in a loaded followee set, and a video switching instruction for switching to a next followee is detected in the video playing interface.

12. The method according to claim 2,
wherein the followee information display interface is pre-registered as a listener of a video playing port in the video playing interface; and
wherein under a condition that the video playing port in the video playing interface is exited, information indicative of the second followee corresponding to the video played in the video playing interface before exit is sent to the followee information display interface.

13. The method according to claim 3,
wherein the followee information display interface is pre-registered as a listener of a video playing port in the video playing interface; and
wherein under a condition that the video playing port in the video playing interface is exited, information indicative of the second followee corresponding to the video played in the video playing interface before exit is sent to the followee information display interface.

14. The method according to claim 4,
wherein the followee information display interface is pre-registered as a listener of a video playing port in the video playing interface; and
wherein under a condition that the video playing port in the video playing interface is exited, information indicative of the second followee corresponding to the video played in the video playing interface before exit is sent to the followee information display interface.

15. The terminal equipment according to claim 9, wherein the displaying at least one user dimension cross slip list corresponding to at least one followee in a followee information display interface comprises:
acquiring updated videos corresponding to each followee in the at least one followee in a followee list;
generating a user dimension cross slip list corresponding to the each followee based on acquired updated videos corresponding to the each followee; and
displaying the user dimension cross slip list corresponding to each followee in the followee information display interface.

16. The terminal equipment according to claim 9, wherein after the jumping to a video playing interface to play a selected video based on selection of a video in a first user dimension cross slip list corresponding to the first followee, the operations further comprise:
loading first additional updated videos corresponding to at least one new followee not loaded into the followee list based on an additional followee loading request detected in the video playing interface;
generating additional user dimension cross slip lists corresponding to the at least one new followee based on the first additional updated videos have been loaded;
updating the followee information display interface based on the additional user dimension cross slip lists; and
providing the first additional updated videos to the video playing interface to enable the first additional updated videos to be played in the video playing interface in a sliding manner.

17. The terminal equipment according to claim 9, wherein after the jumping to a video playing interface to play a selected video based on selection of a video in a first user dimension cross slip list corresponding to the first followee, the operations further comprise:
based on an additional video loading request detected in the video playing interface, loading at least one second additional updated video of the first followee corresponding to the video played in the video playing interface to enable the at least one second additional updated video to be played in the video playing interface in a sliding manner.

18. The terminal equipment according to claim 9,
wherein the followee information display interface is pre-registered as a listener of a video playing port in the video playing interface; and
wherein under a condition that the video playing port in the video playing interface is exited, information indicative of the second followee corresponding to the video played in the video playing interface before exit is sent to the followee information display interface.

19. The terminal equipment according to claim 9, wherein the jumping back to the followee information display interface to display a second user dimension cross slip list corresponding to the second followee further comprises:
playing a transition animation indicating a transition from the video playing interface to a top video in the second user dimension cross slip list corresponding to the second followee.

* * * * *